US008890205B2

(12) United States Patent
Kuenemund et al.

(10) Patent No.: US 8,890,205 B2
(45) Date of Patent: Nov. 18, 2014

(54) SEMICONDUCTOR COMPONENT AND AN OPERATING METHOD FOR A PROTECTIVE CIRCUIT AGAINST LIGHT ATTACKS

(75) Inventors: Thomas Kuenemund, Munich (DE); Dennis Tischendorf, Unterhaching (DE); Uwe Weder, Au/Hallertau, DE (US)

(73) Assignee: Infineon Technologies AG, Neubiberg (DE)

( * ) Notice: Subject to any disclaimer, the term of this patent is extended or adjusted under 35 U.S.C. 154(b) by 89 days.

(21) Appl. No.: 13/450,907

(22) Filed: Apr. 19, 2012

(65) Prior Publication Data

US 2013/0100559 A1    Apr. 25, 2013

(30) Foreign Application Priority Data

Apr. 21, 2011 (DE) .......................... 10 2011 018 450

(51) Int. Cl.
*H01L 29/66* (2006.01)
*H01L 27/04* (2006.01)
*H02H 1/00* (2006.01)
*H01L 23/544* (2006.01)
*G06F 21/55* (2013.01)
*H01L 23/00* (2006.01)
*H01L 21/761* (2006.01)

(52) U.S. Cl.
CPC ................ *H02H 1/00* (2013.01); *H01L 27/04* (2013.01); *H01L 23/544* (2013.01); *H01L 21/761* (2013.01); *G06F 21/558* (2013.01); *H01L 23/573* (2013.01)
USPC ........... 257/146; 257/111; 257/173; 257/362; 257/546

(58) Field of Classification Search
CPC .................................. H01L 27/00; H01L 29/00
USPC .................................... 257/111, 173, 362, 546
See application file for complete search history.

(56) References Cited

U.S. PATENT DOCUMENTS

| 4,481,506 | A | * | 11/1984 | Honma | .......................... 340/630 |
| 4,922,317 | A | * | 5/1990 | Mihara | .......................... 257/372 |
| 5,191,498 | A | * | 3/1993 | Kowalski | .............................. 361/1 |
| 5,338,986 | A | * | 8/1994 | Kurimoto | ....................... 327/566 |
| 5,548,134 | A | * | 8/1996 | Tailliet | ............................ 257/173 |
| 5,721,445 | A | * | 2/1998 | Singh et al. | ................... 257/369 |
| 5,892,262 | A | * | 4/1999 | Wu et al. | ......................... 257/356 |

(Continued)

FOREIGN PATENT DOCUMENTS

| DE | 3743931 A1 | 7/1989 |
| DE | 69424795 T2 | 1/2001 |

OTHER PUBLICATIONS

Gabrielli, A., "Proposal for solid-state particle detector based on latchup effect," Electronics Letters, May 26, 2005, vol. 41, Issue 11. Institution of Engineering and Technology.

(Continued)

*Primary Examiner* — Telly Green
(74) *Attorney, Agent, or Firm* — Murphy, Bilak & Homiller, PLLC

(57) ABSTRACT

A semiconductor component includes a semiconductor substrate, and a doped well having a well terminal and a transistor structure having at least one potential terminal formed in the semiconductor substrate. The transistor structure has a parasitic thyristor, and is at least partly arranged in the doped well. The potential terminal and the well terminal are connected via a resistor.

17 Claims, 2 Drawing Sheets

(56) References Cited

U.S. PATENT DOCUMENTS

| | | | |
|---|---|---|---|
| 5,895,940 A * | 4/1999 | Kim | 257/173 |
| 6,064,555 A | 5/2000 | Czajkowski et al. | |
| 6,583,475 B2 | 6/2003 | Makita et al. | |
| 6,930,501 B2 * | 8/2005 | Bargstadt-Franke et al. | 324/750.3 |
| 2003/0193765 A1 | 10/2003 | Kitano | |
| 2005/0003564 A1 * | 1/2005 | Bargstadt-Franke et al. | 438/14 |
| 2007/0215953 A1 | 9/2007 | Voldman | |
| 2008/0094386 A1 | 4/2008 | Park et al. | |
| 2011/0043245 A1 | 2/2011 | Buard et al. | |

OTHER PUBLICATIONS

Bruguier, G., et al., "Single Particle-Induced Latchup," IEEE Transactions on Nuclear Science, Apr. 1996, pp. 522-532, vol. 43, Issue 2, IEEE Nuclear and Plasma Sciences Society.

Song, Y., et al., "Parametric Investigation of Latch-Up Sensitivity in 1.25 um CMOS Technology," IEEE Transactions on Nuclear Science, Dec. 1987, pp. 1431-1437, vol. 34, Issue 6, IEEE Nuclear and Plasma Sciences Society.

Hospelhorn, R.L. et al., "Radiation Induced Latch-Up Modeling of CMOS IC's," IEEE Transactions on Nuclear Science, Dec. 1987, pp. 1396-1401, vol. 34, Issue 6, IEEE Nuclear and Plasma Sciences Society.

Troutman, R.R., et al., "A Transient Analysis of Latchup in Bulk CMOS," IEEE Transactions on Electron Devices, Feb. 1983, pp. 170-179, vol. 30, Issue 2, IEEE Electron Devices Society.

Estreich, D.B., et al., "Modeling Latch-Up in CMOS Integrated Circuits," IEEE Transactions on Computer-Aided Design of Integrated Circuits and Systems, Oct. 1982, pp. 157-162, vol. 1, Issue 4, IEEE Council on Electronic Design Automation.

Fang, R.C.-Y., et al., "Latchup Model for the Parasitic p-n-p-n. Path in Bulk CMOS," IEEE Transactions on Electron Devices, Jan. 1984, pp. 113-120, vol. 31, Issue 1, IEEE Electron Devices Society.

Plaag, R.E., et al., "A Distributed Model for Radiation-Induced Latchup," IEEE Transactions on Nuclear Science, Dec. 1988, pp. 1563-1568, vol. 35, Issue 6, IEEE Nuclear and Plasma Sciences Society.

Johnston, A.H., "The Influence of VLSI Technology Evolution on Radiation-Induced Latchup in Space Systems," IEEE Transactions on Nuclear Science, Apr. 1996, pp. 505-521, vol. 43, Issue 2, IEEE Nuclear and Plasma Sciences Society.

Johnston, A.H., et al., "The Effect of Circuit Topology on Radiation-Induced Latchup," IEEE Transactions on Nuclear Science, Dec. 1989, pp. 2229-2238, vol. 36, Issue 6, IEEE Nuclear and Plasma Sciences Society.

Johnston, A.H., et al., "Latchup in CMOS from Single Particles," IEEE Transactions on Nuclear Science, Dec. 1990, pp. 1886-1893, vol. 37, Issue 6, IEEE Nuclear and Plasma Sciences Society.

\* cited by examiner

SEMICONDUCTOR COMPONENT AND AN OPERATING METHOD FOR A PROTECTIVE CIRCUIT AGAINST LIGHT ATTACKS

PRIORITY CLAIM

This application claims priority to German Patent Application No. 10 2011 018 450.3 filed on 21 Apr. 2011, the content of said German application incorporated herein by reference in its entirety.

TECHNICAL FIELD

The present invention relates to a semiconductor component and an operating method for a protective circuit against light attacks.

BACKGROUND

Semiconductor components comprising a logic circuit, such as are used in a CPU, for example, are often constructed with CMOS (complementary metal oxide semiconductor) gates. CMOS gates contain p-channel transistors arranged in an n-conductively doped well. The n-type wells are fixedly connected to the highest electrical potential provided (supply voltage $V_{DD}$). The pn junction between the n-conductively doped well and the source-drain regions becomes non-conducting. Defined transistor properties are obtained as a result. Moreover, this arrangement prevents the well potential from falling below a value at which a so-called latch-up occurs that is to say a transition of the semiconductor component to a low-impedance state that can lead to an electrical short circuit and thus to thermal destruction of the component.

One problem in the case of semiconductor components for security-critical applications is also required safeguarding against light attacks by which functional disturbances of the component can be brought about or an undesirable external analysis of the circuit construction is intended to be made possible. There are already a number of proposals as to how a semiconductor component can be protected against light attacks.

In the case of light attacks, a distinction is made between global light attacks and local light attacks. In the case of global light attacks, the chip is exposed to light or ionizing radiation over a large area. This attack is not restricted to delimited regions. It is known that global light attacks can be detected by light sensors arranged in a scattered manner on the chip.

Local light attacks are locally highly delimited attacks on a semiconductor component and can be carried out by means of a laser, for example. By means of local light attacks, it is possible to change individual bits in sensitive regions. They generally require the chip housing to be opened and the circuit structure to be exposed. Local light attacks can be detected by means of a dual CPU (central processing unit) arrangement, for example.

US 2011/0043245 A1 discloses a semiconductor component including a parasitic activation structure for protection against light attacks, wherein the energy limit value for activating the parasitic structure is lower than the energy limit value for changing the status of a storage flip-flop of the semiconductor component. In this case, a current limiting circuit limits the current flowing in the semiconductor component.

The known measures are not only very complex and make the component considerably more expensive, but, as in the case of the dual CPU arrangement, may also result in an increase in the current consumption/demand and the area requirement. The additional area requirement of the components of a protective circuit readily exceeds the area available for the entire integrated circuit.

SUMMARY

Therefore, it is an object of the present invention to provide a semiconductor component having a cost-effective construction and improved protective properties against local light attacks.

The semiconductor component according to the invention comprises a semiconductor substrate, wherein a doped well having a well terminal and a transistor structure having at least one potential terminal are formed in the semiconductor substrate. A supply potential, for example $V_{DD}$, can be present at the potential terminal. The transistor structure has a parasitic thyristor, which is partly arranged in the doped well, wherein the potential terminal and the well terminal are connected via a resistor.

According to the invention, unlike what is customary in the prior art, the well is not fixedly connected to the highest electrical potential, rather a resistor is arranged between the well terminal and the potential terminal. As a result of this arrangement, the highest electrical potential, for example the positive supply voltage $V_{DD}$, can be present at the potential terminal, while, in the case of a light attack, a lower potential, reduced by the voltage drop across the resistor, is present at the well terminal.

Instead of the positive supply voltage $V_{DD}$ a negative supply voltage $V_{SS}$ can also be present at the potential terminal.

The sensitivity of the parasitic thyristor towards a light attack can be adjusted by means of the value of the resistor. The parasitic thyristor can be adjusted such that it triggers under specific conditions and thus initiates a latch-up or a latch-up preliminary stage. As a result of the high currents which flow in the case of a latch-up or a latch-up preliminary stage, data stored on the semiconductor component can be destroyed or erased. Furthermore, the function of the semiconductor component can be destroyed or the semiconductor component can be thermally damaged or destroyed.

The resistor can be embodied in such a way that a light attack triggers the parasitic thyristor before a functional disturbance for external analysis of the circuit construction or for reading out data stored on the semiconductor component is possible. The resistor advantageously has a value of between 50 and 500 ohms.

The resistor can be an adjustable resistor, wherein the resistor can be adjusted after the end of the manufacturing process. The sensitivity of the parasitic thyristor to light attacks can be changed by the adjustment of the resistor.

The resistor can be a polysilicon resistor or a metal resistor, which can be arranged outside the semiconductor substrate.

In a further exemplary embodiment, the resistor is formed in the semiconductor substrate, for example in a doped well and/or in a diffusion region.

The resistor can also be a regulable resistor, wherein the semiconductor component is embodied such that the resistor can be regulated in a manner dependent on a physical variable measured in the semiconductor component. By way of example, temperature and/or other ambient conditions and/or an ageing-dictated change of the semiconductor component can be taken into account by means of a regulable resistor.

The semiconductor component can furthermore comprise a temperature sensor, wherein the semiconductor component is embodied such that it can regulate the resistor in a manner dependent on a temperature measured by the temperature sensor.

The semiconductor component can be a semiconductor component constructed using CMOS technology. The semiconductor component can also comprise a plurality of transistor structures each having a parasitic thyristor.

In a further exemplary embodiment, the resistor can be connected to the potential terminals of a plurality of transistor structures. In this case, the transistor structures can be a part or the totality of a logic circuit constructed generally with CMOS transistors.

In one exemplary embodiment, the doped well is an n-type well and the electrical potential present at the potential terminal is a positive supply voltage $V_{DD}$, wherein the potential terminal and the well terminal are connected via the resistor, which can be arranged outside the doped well. However, the doped well can also be a p-type well and the electrical potential present at the potential terminal can be a negative supply voltage $V_{SS}$.

Furthermore, the semiconductor component can comprise a current limiting circuit, wherein the current limiting circuit can be designed such that the semiconductor component is not damaged when the parasitic thyristor is triggered. Even though the semiconductor component is not damaged by the current limiting, the function of the semiconductor component can be disturbed in such a way that it is no longer possible to read out data stored on the semiconductor component and/or to conduct an external analysis of the circuit construction.

Furthermore, the semiconductor component can comprise an alarm circuit, wherein the alarm circuit is designed such that a function of the semiconductor component is blocked at least temporarily when the parasitic thyristor is triggered. The semiconductor component can be blocked such that an undesirable external analysis of the semiconductor component or the data content thereof is prevented. Such function can be enabled by a reset, for example.

The semiconductor component according to the invention achieves area-covering protection against light attacks both from the front side and from the rear side (substrate) of the semiconductor component. No further measures are required within the circuit to be protected. The entire circuit integrated into the chip, in particular a complete logic circuit, can be protected. The sensitivity can be preset by the choice of the resistor or by the layer construction of the semiconductor component.

The arrangement of the resistor between the potential terminal and the well terminal and utilization of the latch-up effect make it possible to effectively protect the semiconductor component against light and radiation attacks, virtually without increasing the overall area requirement. Moreover, the arrangement of the resistor between the well terminal and the potential terminal, in contrast to other, known solutions against light attacks, consumes no additional current. Even the subsequent implementation of such a resistor into existing logic circuits, designs and IP blocks is possible without high outlay.

An operating method for a protective circuit and a semiconductor component enables the semiconductor component to be effectively protected against light attacks. In this case, the semiconductor component comprises a semiconductor substrate having a doped well having a well terminal and a transistor structure arranged at least partly in the well and having at least one potential terminal and having a parasitic thyristor, wherein the potential terminal and the well terminal are connected by a resistor. Upon exposure to light or radiation, the parasitic thyristor turns on, as a result of which it is no longer possible to read out data stored on the semiconductor component, or the semiconductor component is functionally disturbed or damaged or destroyed.

Those skilled in the art will recognize additional features and advantages upon reading the following detailed description, and upon viewing the accompanying drawings.

BRIEF DESCRIPTION OF THE DRAWINGS

Exemplary embodiments of the semiconductor component are described in more detail below with reference to the accompanying Figures. The drawings serve to illustrate the basic principle, so that only aspects necessary for understanding the basic principle are illustrated. The drawings are not to scale. In the drawings the same reference characters denote like features.

DETAILED DESCRIPTION

Figure 1:
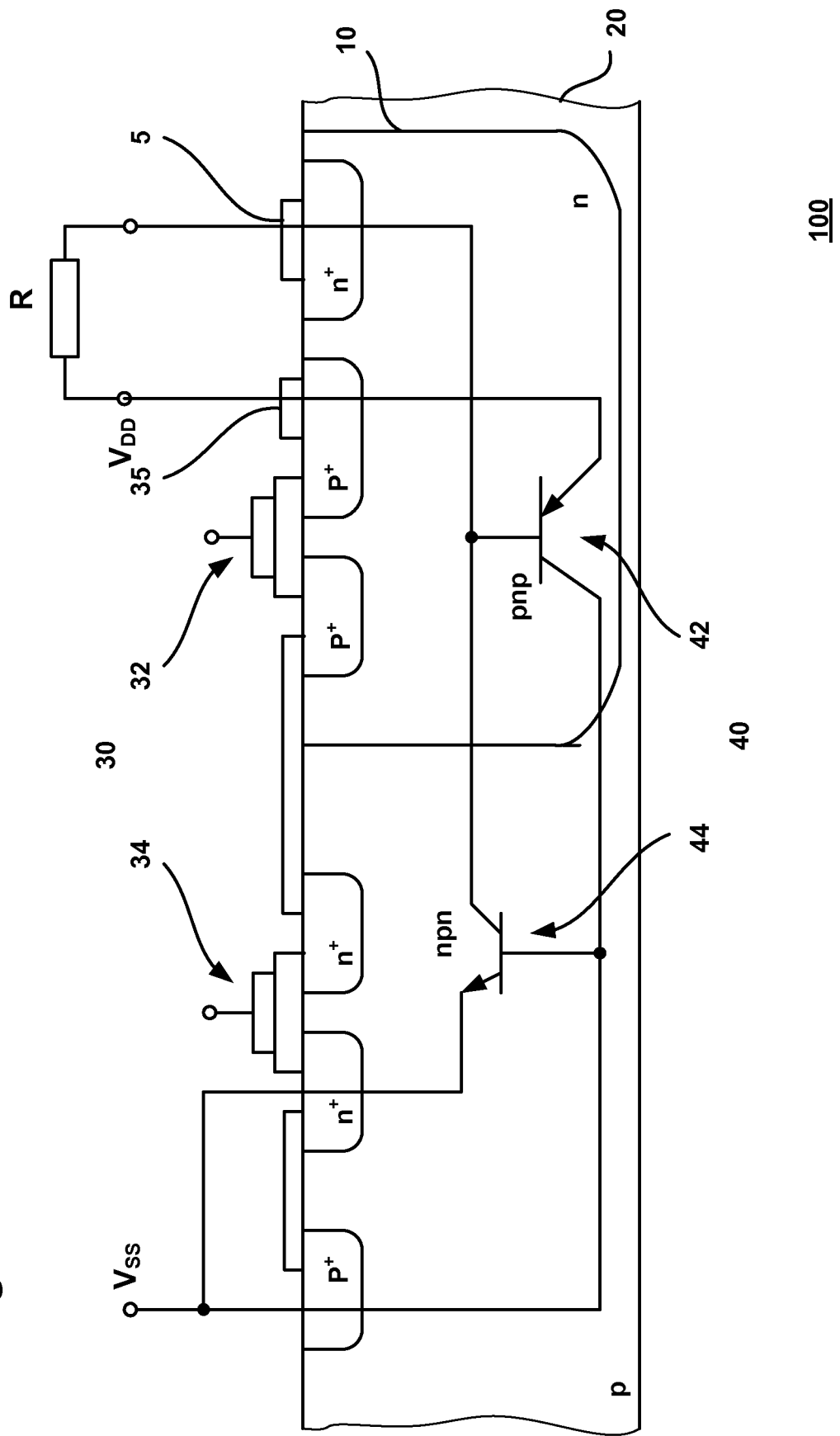
FIG. 1 shows an exemplary embodiment of a semiconductor component in cross section.

FIG. 1 shows an exemplary embodiment of a semiconductor component 100 using CMOS technology in cross section. The semiconductor component 100 comprises an n-channel field effect transistor 34 and a p-channel field effect transistor 32. The two field effect transistors 32, 34 together form a transistor structure 30. While the n-channel field effect transistor 34 is arranged in a p-doped semiconductor substrate 20 of the semiconductor component 100, the p-channel field effect transistor 32 is arranged in an n-doped well 10 formed in the semiconductor substrate 20. The n-doped well 10 has a well terminal 5 with an $n^+$-doped diffusion region. The p-channel field effect transistor 32 has a potential terminal 35. A supply voltage $V_{DD}$ is present at the potential terminal 35. The supply voltage $V_{DD}$ of a semiconductor component 100 can be approximately 1.5 V.

The layer construction of the individual dopings of the transistor structure 30 results in a parasitic npn bipolar transistor 44 and a parasitic pnp bipolar transistor 42. The npn bipolar transistor 44 and the pnp bipolar transistor 42 correspond to a parasitic thyristor 40 in terms of their mutual interconnection.

The parasitic thyristor 40 has a lateral npn bipolar transistor 44 and a vertical pnp bipolar transistor 42. The source-drain regions of the p-channel field effect transistor 32 are the emitter and the n-doped well 10 is the base of the resultant pnp bipolar transistor 42, while the p-doped semiconductor substrate 20 constitutes the collector. Correspondingly, the source-drain regions of the n-channel field effect transistor 34, the p-doped semiconductor substrate 20 and the n-doped well 10 form the emitter, base and collector of the npn bipolar transistor 44. The potential terminal 35 and the well terminal 5 are connected to one another via a resistor R. The resistor R, as illustrated schematically in this exemplary embodiment is arranged outside the semiconductor substrate 20 or outside the doped well 10. The sensitivity of the parasitic thyristor 40 towards a light attack can be adjusted by the value of the resistor R. The parasitic thyristor 40 can be adjusted such that it triggers under specific conditions and thus initiates a latch-up or a latch-up preliminary stage.

The npn bipolar transistor 44 and the pnp bipolar transistor 42 are turned off under normal operating conditions. If, on account of external conditions, for example as a result of a light attack, a voltage drop occurs at one of the two base-emitter diodes of one of the two parasitic bipolar transistors 42, 44, then a collector current flows through this bipolar transistor. This collector current produces a voltage drop across the complementary bipolar transistor. If, in the latter as well, the base-emitter voltage is exceeded, both bipolar transistors 42, 44 are now in the on-state. The consequence is a positive feedback between the two bipolar transistors 42, 44, thus giving rise to a permanent low-impedance connection between the supply voltage $V_{DD}$ and ground $V_{SS}$. This low-impedance connection can then be disconnected only by removal of the supply voltage $V_{DD}$.

If the current supply of one of the two parasitic bipolar transistors 42, 44 is high enough, then the arrangement remains in an active state even after the disappearance of the currents injected, for example by a light attack. This state is called latch-up or latching state. The latch-up leads to a malfunction of the semiconductor component 100 since the outputs of the field effect transistors 32, 34 are at a fixed potential and no longer react to changes at the gate terminal. As a result of the high currents flowing during a latch-up or a latch-up preliminary stage, data stored on the semiconductor component 100 can be erased or altered. In the case of very high currents, thermal destruction or melting of the feeding metal tracks or underlying structures of the semiconductor component 100 can occur. Even if the semiconductor component 100 is not damaged by the latch-up or its preliminary stage, the function of the semiconductor component 100 can be lastingly disturbed.

Figure 2:
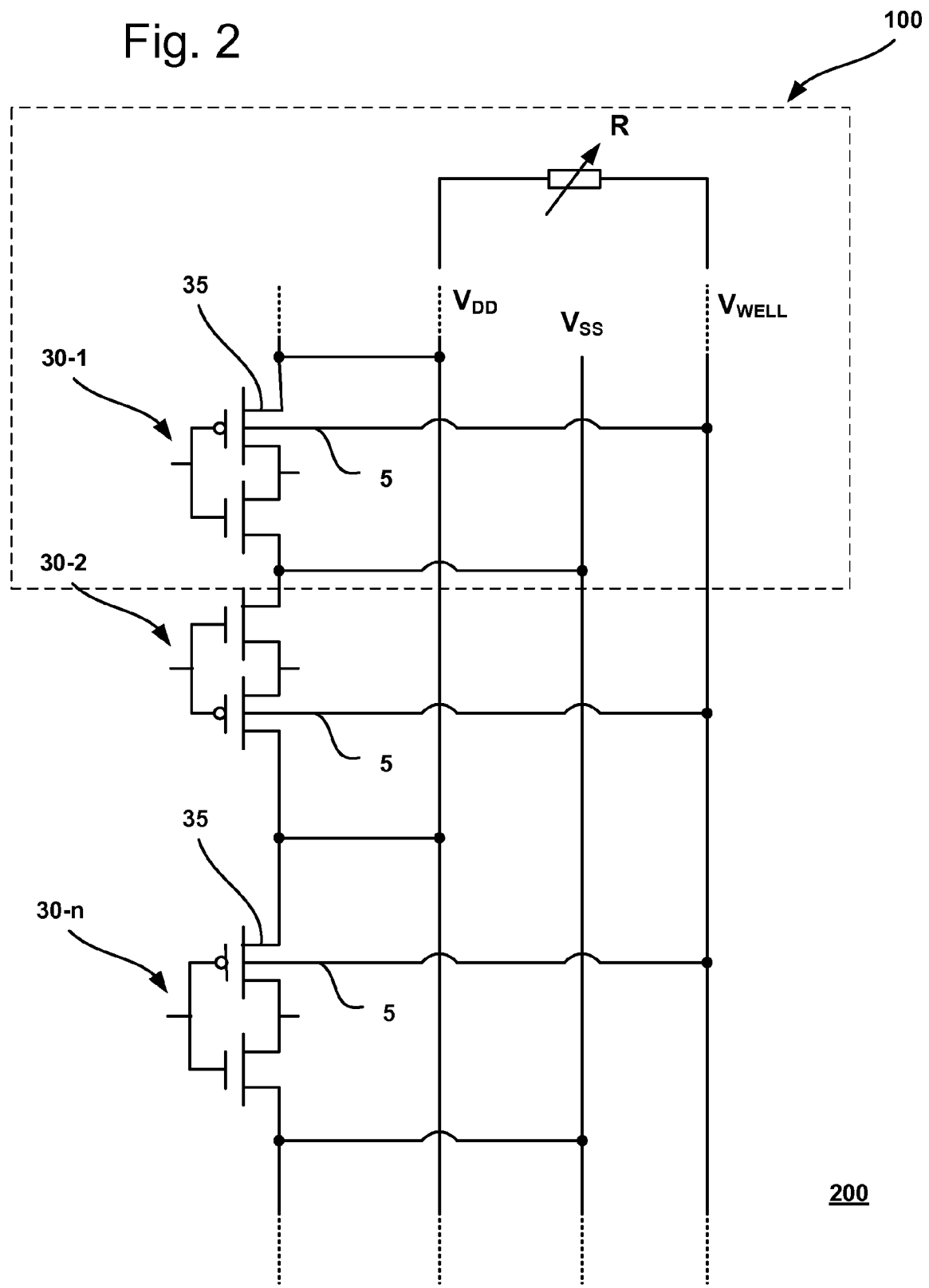
FIG. 2 shows an exemplary embodiment of a logic circuit.

FIG. 2 shows a plurality of semiconductor components 100 arranged in the form of a logic circuit 200. In this exemplary embodiment, the resistor R is an adjustable or regulable resistor. The resistor R is arranged between the potential terminals 35 of a plurality of transistor structures 30-1, 30-2, . . . 30-$n$ and the well terminals 5 of the transistor structures 30-1, 30-2, . . . 30-$n$. In this case, each transistor structure 30-1, 30-2, . . . 30-$n$ has a parasitic thyristor. In this case, the transistor structures 30-1, 30-2, . . . 30-$n$ are part of a synthesized logic/logic circuit.

A positive supply voltage $V_{DD}$ is present at the potential terminals 35 and a voltage $V_{WELL}$ is present at the well terminals 5. In the normal operating state, the voltage $V_{WELL}$ at the well terminals 5 is equal to the positive supply voltage $V_{DD}$. In the case of a light attack, the supply voltage $V_{DD}$ remains constant, while the voltage $V_{WELL}$ decreases by the voltage drop across the resistor R.

The sensitivity of the parasitic thyristors of the transistor structures 30-1, 30-2, . . . 30-$n$ towards a light attack can be adjusted by the value of the resistor R. The parasitic thyristors can be adjusted such that they trigger under specific conditions and thus initiate a latch-up or a latch-up preliminary stage. As a result of the high currents which flow during a latch-up or a latch-up preliminary stage, data stored on the semiconductor components 100 can be destroyed or erased. Furthermore, the function of the semiconductor components 100 can be disturbed or the semiconductor components 100 can be thermally damaged or destroyed.

The construction of the logic circuit 200 with the semiconductor components 100 according to the invention makes it possible to effectively protect the entire logic circuit 200 against light or radiation attacks, without additional design measures, sensors or area expenditure.

If the resistor R is an adjustable resistor, the resistor R can be adjusted after the end of the manufacturing process. By way of example, the sensitivity of the parasitic thyristors to light attacks can be adjusted by the adjustment of the resistor R.

If the resistor R is a regulable resistor, then the resistor R can be embodied such that the resistor R can be regulated in a manner dependent on a physical variable measured in the semiconductor component 100. By way of example, temperature and/or other ambient conditions and/or an ageing dictated change of the semiconductor component 100 can be taken into account by a regulable resistor R.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A semiconductor component, comprising:
a semiconductor substrate;
a doped well formed in the semiconductor substrate, the doped well having a well terminal;
a transistor structure formed in the semiconductor substrate, the transistor structure having a potential terminal and a parasitic thyristor partly arranged in the doped well; and
a resistor connecting the potential terminal and the well terminal.

2. A semiconductor component according to claim 1, wherein the resistor is operable such that that a light attack turns on the parasitic thyristor.

3. A semiconductor component according to claim 1, wherein the resistor is arranged outside the doped well.

4. A semiconductor component according to claim 3, wherein the resistor is a polysilicon resistor or a metal resistor.

5. A semiconductor component according to claim 1, wherein the resistor is arranged outside the semiconductor substrate.

6. A semiconductor component according to claim 5, wherein the resistor is a polysilicon resistor or a metal resistor.

7. A semiconductor component according to claim 1, wherein the resistor is formed in the semiconductor substrate, in a doped well and/or in a diffusion region.

8. A semiconductor component according to claim 1, wherein the resistor is an adjustable resistor and the semiconductor component is operable such that the sensitivity of the parasitic thyristor to light attacks is adjustable by an adjustment of the resistor.

9. A semiconductor component according to claim 1, wherein the resistor is a regulable resistor and the semiconductor component is operable to regulate the resistor based on a physical variable measured in the semiconductor component.

10. A semiconductor component according to claim 9, wherein the semiconductor component is operable to regulate the resistor based on a temperature measured in the semiconductor component.

11. A semiconductor component according to claim 1, wherein the semiconductor component is a CMOS semiconductor component.

12. A semiconductor component according to claim 1, wherein the semiconductor component comprises a plurality of transistor structures each having a parasitic thyristor.

13. A semiconductor component according to claim 12, wherein the resistor is connected to the potential terminals of the plurality of transistor structures.

14. A semiconductor component according to claim 1, wherein the doped well is an n-type well and the electrical potential present at the potential terminal is a positive supply voltage.

15. A semiconductor component according to claim 1, wherein the semiconductor component comprises a logic circuit and the transistor structure is a part of the logic circuit.

16. A semiconductor component according to claim 1, wherein the transistor structure comprises an n-channel field effect transistor and a p-channel field effect transistor, wherein the semiconductor substrate is p-doped and the n-channel field effect transistor is arranged in the p-doped semiconductor substrate, wherein the doped well is n-doped and the p-channel field effect transistor is arranged in the n-doped well, and wherein the parasitic thyristor includes a parasitic npn bipolar transistor and a parasitic pnp bipolar transistor.

17. A semiconductor component according to claim 16, wherein the well terminal has an n+-doped diffusion region in the n-doped well.

* * * * *

UNITED STATES PATENT AND TRADEMARK OFFICE
CERTIFICATE OF CORRECTION

| | |
|---|---|
| PATENT NO. | : 8,890,205 B2 |
| APPLICATION NO. | : 13/450907 |
| DATED | : November 18, 2014 |
| INVENTOR(S) | : T. Kuenemund et al. |

Page 1 of 1

It is certified that error appears in the above-identified patent and that said Letters Patent is hereby corrected as shown below:

In the Claims,

At column 6, line 42 (claim 2, line 2) of the printed patent, please delete "that" before a.

Signed and Sealed this
Seventh Day of April, 2015

Michelle K. Lee
*Director of the United States Patent and Trademark Office*